United States Patent [19]

Goossens

[11] 4,148,843

[45] Apr. 10, 1979

[54] COMPOSITIONS OF CAPPED POLYPHENYLENE OXIDES AND ALKENYL AROMATIC RESINS

[75] Inventor: John C. Goossens, Mt. Vernon, Ind.

[73] Assignee: General Electric Company, Pittsfield, Mass.

[21] Appl. No.: 863,670

[22] Filed: Dec. 23, 1977

[51] Int. Cl.$^2$ ............................................. C08L 25/00
[52] U.S. Cl. ................................................... 260/874
[58] Field of Search ......................................... 260/874

[56] References Cited

U.S. PATENT DOCUMENTS

| | | | |
|---|---|---|---|
| 3,356,761 | 12/1967 | Fox | 260/874 |
| 3,384,682 | 5/1968 | Erchak et al. | 260/874 |
| 3,487,127 | 12/1969 | Erchak et al. | 260/876 R |
| 3,664,977 | 5/1972 | Wakanishi et al. | 260/876 R |
| 3,700,630 | 10/1972 | Hamada et al. | 260/17.2 S |
| 3,700,750 | 10/1972 | Yamanouchi et al. | 260/874 |
| 3,751,388 | 8/1973 | Tabana et al. | 260/23 S |

FOREIGN PATENT DOCUMENTS

| | | | |
|---|---|---|---|
| 1939033 | 2/1970 | Fed. Rep. of Germany | 260/874 |
| 2126434 | 7/1973 | Fed. Rep. of Germany | 260/874 |

*Primary Examiner*—M. J. Welsh
*Attorney, Agent, or Firm*—Morgan, Finnegan, Pine, Foley & Lee

[57] ABSTRACT

There is described a process for making a composition of a capped polyphenylene oxide and an alkenyl aromatic resin which is based on the thermal polymerization of an alkenyl aromatic monomer in the presence of a capped polyphenylene oxide.

12 Claims, No Drawings

COMPOSITIONS OF CAPPED POLYPHENYLENE OXIDES AND ALKENYL AROMATIC RESINS

This invention provides a novel process for making compositions of a capped polyphenylene oxide and an alkenyl aromatic resin that is based on the thermal polymerization of an alkenyl aromatic monomer in the presence of a capped polyphenylene oxide resin.

BACKGROUND OF THE INVENTION

The term "polyphenylene oxide resin" includes a family of polymers that are well known to those skilled in the art. These polymers may be made by a variety of catalytic and non-catalytic processes from the corresponding phenols or reactive derivatives thereof. By way of illustration certain of the polyphenylene oxides are disclosed in Hay, U.S. Pat. No. 3,306,874 and 3,306,875, and in Stamatoff, 3,257,357 and 3,257,388. In the Hay patents the polyphenylene oxides are prepared by an oxidative coupling reaction comprising passing an oxygen-containing gas through a reaction solution of a phenol and a metal-amine complex catalyst. Other disclosures relating to processes for preparing polyphenylene oxide polymers including graft copolymers of polyphenylene oxides with styrene type compounds, are found in Fox, U.S. Pat. No. 3,356,761; Sumitomo, U.K. Pat. No. 1,291,609; Bussink et al; U.S. Pat. No. 3,337,449; Blanchard et al, U.S. Pat. No. 3,219,626; Laakso et al, U.S. Pat. No. 3,342,892; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or phenolate); Kobayashi et al, U.S. Pat. No. 3,445,880 (cobalt chelates); Olander, U.S. Pat. No. 3,956,242 and the like. In the Stamatoff patents, the polyphenylene ethers are produced by reacting the corresponding phenolate ion with an initiator, such as peroxy acid salt, an acid peroxide, a hypohalite and the like, in the presence of a complexing agent. Disclosures relating to non-catalytic processes, such as oxidation with lead dioxide, silver oxide etc., are described in Price et al, U.S. Pat. No. 3,382,212. Cizek, U.S. Pat. No. 3,383,435 discloses polyphenylene ether-styrene resin compositions. All of the above-mentioned disclosures are incorporated herein by reference. In Ser. No. 401,994, filed Oct. 1, 1973, a process is described for preparing compositions of a polyphenylene oxide, a rubber and an alkenyl aromatic monomer. An analogous process is described in Ser. No. 401,987 filed Oct. 1, 1973. These processes are based on the use of the alkenyl aromatic monomers as the reaction solvents for a phenolic monomer. After the polyphenylene oxide is formed, the alkenyl aromatic monomer is polymerized to an alkenyl aromatic resin by a free radical catalyst. Thermal polymerization of the alkenyl aromatic monomer is also mentioned in these applications.

The present invention is based on the discovery that the use of a capped polyphenylene oxide in a process wherein an alkenyl aromatic monomer is polymerized in the presence of a polyphenylene oxide, results in a composition wherein the alkenyl aromatic polymer has a higher molecular weight as compared with a composition prepared under similar conditions with an uncapped polyphenylene oxide.

Accordingly, it is a primary object of this invention to provide an improved process for the preparation of a composition of a polyphenylene oxide resin and a styrene resin.

DETAILED DESCRIPTION OF THE INVENTION

The present invention is directed toward a process for the preparation of a composition which comprises:
(a) a capped polyphenylene oxide resin; and
(b) an alkenyl aromatic resin. The process comprises a first step of forming a mixture of a capped polyphenylene oxide in an alkenyl aromatic monomer and a second step of heating said mixture for a sufficient period of time at an elevated temperature to form a composition of a capped polyphenylene oxide resin and an alkenyl aromatic resin.

The capped polyphenylene oxide resins are formed from oxidatively coupled phenolic monomers of the formula:

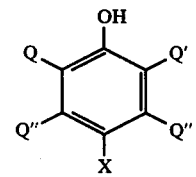

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus; hydrocarbonoxy radicals and halohydrocarbonoxy radicals having at least two carbon atoms between the halogen atom and the phenol nucleus; and Q' and Q" are the same as Q and in addition may be halogen, with the proviso that Q, Q' and Q" are all free of a tertiary alpha-carbon atom. Polymers formed from these phenolic compounds will correspond to the formula:

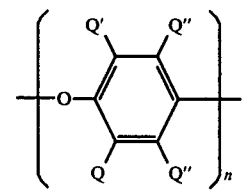

wherein the oxygen ether atom of one repeating unit is connected to the phenylene nucleus of the next repeating unit and Q, Q' and Q" are as above defined; and n is an integer equal to at least 50.

The preferred polyphenylene oxides are those wherein Q and Q' are lower alkyl and Q" is hydrogen. Poly(2,6-dimethyl-1,4-phenylene oxide) is the most preferred polyphenylene oxide.

The capped polyphenylene oxides may be prepared by reaction of a selected polyphenylene oxide with a compound selected from the group consisting of acid halides, acid anhydrides and ketenes.

Acid halides include acetyl chloride, acetyl bromide, benzoyl chloride, cinnamoyl chloride, succinoyl chloride, succinyol fluoride, adipoyl chloride, steroyl chloride, lauroyl chloride, malonoyl chloride, terephthaloyl chloride, isophthaloyl chloride, phosphoryl chloride, thionyl chloride and the like. Suitable acid anhydrides, include acetic anhydride, a maleic anhydride, butyric anhydride, trichloroacetic anhydride, propionic anhydride, pivalic anhydride, phthalic anhydride, succinic anhydride, m-dichlorobenzoic anhydride, 2,3,4,5,6-pentachlorobenzoic anhydride, pentanoic anhydride, palmitic anhydride, stearic anhydride and the like. Ketenes include diphenyl ketene, unsubstituted ketene, butyl ethyl ketene and the like.

The capping procedure is well known and is exemplified by U.S. Pat. No. 3,375,228 which is incorporated by reference. The procedure generally involves the reaction of the hydroxyl groups of the polyphenylene oxide to form inert substituents such as halo or acetyl groups.

The alkenyl aromatic monomers may be of the formula:

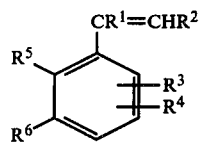

wherein $R^1$ and $R^2$ are selected from the group consisting of lower alkyl or lower alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl or lower alkenyl groups of 1 to 6 carbon atoms or $R^5$ and $R^6$ may be concatenated together with hydrocarbyl groups to form a naphthyl group. These compounds are free of any substituent having a tertiary carbon atom.

The preferred alkenyl aromatic monomers include styrene, chlorostyrene, vinyl naphthalene, vinyl xylene and alpha-methylstyrene. A rubbery impact modifier may be added to the composition. Examples of these materials include polybutadiene rubber, styrene butadiene rubber, natural rubber, neoprene, butyl rubber, ethylene propylene copolymer, EPDM rubbers, acrylonitrile rubber, A-B block copolymer wherein the A represents a polymerized block of styrene and B represents a polymerized block of butadiene or an A-B-A block copolymer wherein A and B have the same meanings set forth hereinabove. The A-B-A block copolymers are described in Zelinski. U.S. Pat. No. 3,251,905 and Holden et al, U.S. Pat. No. 3,231,635 which are hereby incorporated by reference.

The compositions of the invention may also be prepared in the presence of reinforcing amounts of a suitable reinforcing filler. For example, from 5 to 40% by weight based on the weight of the total composition may comprise fibrous glass.

The composition of the invention will comprise from 10–90 parts by weight or more preferably from 20–50 parts by weight of the capped polyphenylene oxide resin and from 90–10 parts by weight or more preferably from 80–50 parts by weight of the alkenyl aromatic resin component.

The process may be carried out in any suitable reactor equipped with heating means and agitating means. An alkenyl aromatic monomer is combined with the capped polyphenylene oxide with moderate heating i.e. 40°–60° C. After these materials are combined, the reactor is heated for a period of time and at a temperature to cause the alkenyl aromatic monomer to polymerize and form the composition. Generally temperatures of from 105°–175° C. may be empolyed for a period of 2 to 10 hours.

If temperatures above the boiling point of the alkenyl aromatic monomer are used, pressure vessels should be used to prevent vaporization. Generally the intrinsic viscosity of the alkenyl aromatic resin should be between 0.20 dl/g and 0.90 dl/g as measured in toluene at 30° C.

DESCRIPTION OF THE PREFERRED EMBODIMENTS

The process of the present invention is further illustrated in the following examples which are set forth as further descriptions of the invention, but are not to be construed as limiting the invention hereto.

EXAMPLE 1

A 1.5 liter stainless steel resin pot fitted with a stirrer, nitrogen gas inlet and a reflux condenser was charged with 210 g. of acetate capped poly(2,6-dimethyl-1,4-phenylene oxide) having an intrinsic viscosity of about 0.5 dl/g as measured in chloroform at 30° C. and 390 g. of styrene monomer. The temperature was raised to 140° C. for 3 hours. The polystyrene was separated with methylene chloride using the procedure of U.S. Pat. No. 3,644,227, and was found to have an I.V. of 0.77 dl/g as measured in toluene at 30° C. A control run using uncapped poly(2,6-dimethyl-1,4-phenylene oxide) resulted in a polystyrene having an I.V. of about 0.60 dl/g. The presence of non-chemically bound impurities in the uncapped poly(2,6-dimethyl-1,4-phenylene oxide) has been found to result in a further depression of the I.V. of polystyrene prepared in this manner.

EXAMPLE 2

The procedure of Example 1 was repeated except that a poly(2,6-dimethyl-1,4-phenylene oxide) which was capped with phosphonyl chloride was used. The separated polystyrene had an I.V. of 0.72 dl/g as measured in toluene at 30° C.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A process for the preparation of a composition which comprises:
    (a) a polyphenylene oxide resin that is capped with a compound selected from the group consisting of acid halides, acid anhydrides and ketenes; and
    (b) an alkenyl aromatic resin; said process comprising forming a mixture of a capped polyphenylene oxide in an alkenyl aromatic monomer and thereafter heating said mixture for a sufficient period of time at an elevated temperature to form said composition.

2. A process as defined in claim 1 wherein the capped polyphenylene oxide is derived from compounds of the formula:

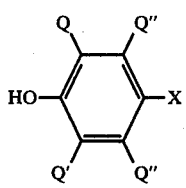

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus; hydrocarbonoxy radicals and halohydrocarbonoxy radicals having at least two carbon atoms between the halogen atom and the phenol nucleus; Q' and Q" are the same as Q and in addition may be halogen, with the proviso that Q, Q' and Q" are all free of a tertiary-alpha-carbon atom.

3. A process as defined in claim 2 wherein the polyphenylene oxide is capped with a compound selected from the group consisting of acid halides, acid anhydrides and ketenes.

4. A process as defined in claim 3 wherein the alkenyl aromatic monomer is selected from compounds of the formula:

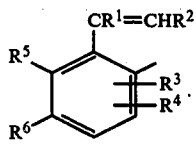

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom.

5. A process as defined in claim 4 wherein the composition comprises from 10–90 parts by weight of the capped polyphenylene oxide and 90–10 parts by weight of alkenyl aromatic resin.

6. A process as defined in claim 5 wherein the composition includes a reinforcing amount of a reinforcing filler.

7. A process as defined in claim 1 wherein the mixture is thermally polymerized at a temperature of from 105°–175° C.

8. A process for the preparation of a composition which comprises:
(a) 10–90 parts by weight of poly(2,6-dimethyl-1,4-phenylene oxide) that is capped with a compound selected from the group consisting of acid halides, acid anhydrides and ketenes; and
(b) 90–10 parts by weight of polystyrene resin; said process comprising forming a mixture of which consists of a capped polyphenylene oxide and styrene monomer and heating said mixture for a period of time at a temperature that is sufficient to cause the styrene monomer to polymerize and form said composition.

9. A process as defined in claim 8 wherein the capped poly(2,6-dimethyl-1,4-phenylene oxide) is derived from a capping agent selected from the group consisting of acid halides, acid anhydrides and ketenes.

10. A process as defined in claim 9 wherein the capping agent is phosphoryl chloride.

11. A process as defined in claim 9 wherein the capping agent is an acetate forming compound.

12. A composition which comprises:
(a) a polyphenylene oxide resin that is capped with a compound selected form the group consisting of acid halides, acid anhydrides and ketenes; and
(b) an alkenyl aromatic resin.

* * * * *